(12) United States Patent
Rodriguez et al.

(10) Patent No.: US 10,448,484 B1
(45) Date of Patent: Oct. 15, 2019

(54) INTEGRATED DIGITAL LIGHTING CONTROLLER

(71) Applicant: ABL IP Holding LLC, Atlanta, GA (US)

(72) Inventors: Yan Rodriguez, Suwanee, GA (US); Antonio Marques, Covington, GA (US); Steven E. Downs, Lilburn, GA (US); Bo Liu, Hampton, GA (US); Luy V. Dang, Snellville, GA (US); Queen Padgett, Snellville, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/156,016

(22) Filed: Oct. 10, 2018

(51) Int. Cl.
| | |
|---|---|
| H05B 33/00 | (2006.01) |
| H05B 37/02 | (2006.01) |
| H05B 37/03 | (2006.01) |
| H02J 9/06 | (2006.01) |

(52) U.S. Cl.
CPC ..... *H05B 37/0227* (2013.01); *H05B 37/0218* (2013.01); *H05B 37/0272* (2013.01); *H05B 37/03* (2013.01); *H02J 9/061* (2013.01)

(58) Field of Classification Search
CPC ............ H05B 37/0227; H05B 37/0272; H05B 37/0281; H05B 33/0872; H05B 33/0803; H05B 33/0854; H05B 37/0218; H05B 33/0857; H05B 33/0845; H05B 33/089
See application file for complete search history.

(56) References Cited

U.S. PATENT DOCUMENTS

| | | | |
|---|---|---|---|
| 8,525,446 B2 | 9/2013 | Tikkanen et al. | |
| 8,581,521 B2 | 11/2013 | Welten et al. | |
| 9,351,378 B2 | 5/2016 | Aggarwal et al. | |
| 9,655,213 B2 | 5/2017 | Cho et al. | |
| 2010/0060194 A1* | 3/2010 | Furry | H05B 33/0803 315/294 |
| 2011/0009746 A1 | 1/2011 | Tran et al. | |
| 2011/0133655 A1* | 6/2011 | Recker | H02J 9/02 315/159 |

* cited by examiner

*Primary Examiner* — Monica C King
(74) *Attorney, Agent, or Firm* — Kilpatrick Townsend & Stockton LLP (57) ABSTRACT

A luminaire includes: at least one digital sensor; an illumination element; a main power supply including driver functions configured to provide power to the illumination element; and an integrated digital lighting controller in communication with the main power supply and the at least one digital sensor. The integrated digital lighting controller configured to: receive digital signals corresponding to a sensed parameter from the at least one digital sensor; determine a lighting characteristic for the illumination element based at least in part on the digital signals from the at least one digital sensor; and generate one or more control signals to the main power supply to control the driver functions to provide power to the illumination element to produce the determined lighting characteristic.

21 Claims, 4 Drawing Sheets

INTEGRATED DIGITAL LIGHTING CONTROLLER

BACKGROUND

Unless otherwise indicated herein, the materials described in this section are not prior art to the claims in this application and are not admitted to be prior art by inclusion in this section.

Conventional luminaires use direct communication with the luminaire to receive dimming or other commands. The communication (i.e., control signals) may be provided by a separate dimmer device or lighting controller. In addition, various external sensors attached to the luminaire provide analog signals used by the luminaire to determine ambient conditions. Thus, lighting characteristics may not be controlled based on actual lighting requirements at the luminaire. However, the ability to control the light output of a luminaire is important for proper functional lighting and aesthetic lighting as well as to reduce energy consumption. In addition, for installations having multiple devices with multiple housings, multiple communications interfaces, and limited configuration options, especially for sensors, adding sensors or other peripherals after installation can present difficulties.

SUMMARY

Apparatuses for providing an integrated digital lighting controller for a luminaire are provided.

According to various aspects there is provided a luminaire. In some aspects, the luminaire may include: at least one digital sensor; an illumination element; a main power supply including driver functions configured to provide power to the illumination element; and an integrated digital lighting controller in communication with the main power supply and the at least one digital sensor. The integrated digital lighting controller configured to: receive digital signals corresponding to a sensed parameter from the at least one digital sensor; determine a lighting characteristic for the illumination element based at least in part on the digital signals from the at least one digital sensor; and generate one or more control signals to the main power supply to control the driver functions to provide power to the illumination element to produce the determined lighting characteristic.

The lighting controller may include a digital peripheral interface. The digital peripheral interface may be configured to provide mechanical and electrical coupling of the at least one digital sensor to the integrated digital lighting controller via an electrical connector disposed on the integrated digital lighting controller and a mating electrical connector disposed on the at least one digital sensor. The digital peripheral interface may be configured to communicate with a processor of the integrated digital lighting controller via a digital communications bus The digital peripheral interface may be configured to provide power to the at least one digital sensor, and communicate with the at least one digital sensor via LEDcode protocol. The at least one smart sensor may be a gas sensor, a daylight sensor, an occupancy sensor, or a proximity sensor.

The luminaire may include a wireless communications module configured to receive configuration settings for the at least one digital sensor and/or configuration settings the luminaire from a remote device and transmit information related to operating conditions of the luminaire to the remote device. The integrated digital lighting controller may be configured to perform self-diagnostic tests, and results of the self-diagnostic tests may be transmitted to a remote device via a wireless communications module.

The luminaire may include a back-up power supply. The integrated digital lighting controller may be communicatively coupled to the back-up power supply and may be configured to perform diagnostic tests of the back-up power supply. Results of the diagnostic test of the back-up power supply may be transmitted to a remote device via a wireless communications module. The at least one digital sensor, the illumination element, the main power supply, the integrated digital lighting controller, and the back-up power supply may be disposed in a housing of the luminaire.

According to various aspects there is provided an integrated digital lighting controller. In some aspects, the integrated digital lighting controller may include: a processor; and a digital peripheral interface. The processor may be communicatively coupled to the digital peripheral interface, and may be configured to receive digital signals corresponding to a sensed parameter from one or more digital sensors in communication with the digital peripheral interface; and lighting control signals to a main power supply configured to provide driver functions to provide power to an illumination element based on the digital signals from the one or more digital sensors.

The digital peripheral interface may be configured to communicate with the processor via a digital communications bus, provide power to the one or more digital sensors, and communicate with the one or more digital sensors via LEDcode protocol. The one or more digital sensors may be mechanically and electrically coupled to the integrated digital lighting controller via an electrical connector disposed on the integrated digital lighting controller and a mating electrical connector disposed on the one or more digital sensors. An electrical connection may be formed with a corresponding port of the digital peripheral interface. The one or more digital sensors may be a gas sensor, a daylight sensor, an occupancy sensor, and/or a proximity sensor.

The integrated digital lighting controller may include a wireless communications module communicatively coupled to the processor. The wireless communications module may be configured to receive configuration settings from a remote device and transmit information related to operating conditions of a luminaire to the remote device. The processor may be configured to perform diagnostic test on a back-up power supply. Results of the diagnostic test of the back-up power supply may be transmitted to a remote device via a wireless communications module.

According to various aspects there is provided an integrated digital lighting controller. In some aspects, the integrated digital lighting controller may include: a wireless communications module; and a digital peripheral interface. The wireless communications module may be communicatively coupled to the digital peripheral interface via a digital communications bus, and may be configured to: receive digital signals corresponding to a sensed parameter from one or more digital sensors in communication with the digital peripheral interface; and provide lighting control signals a main power supply configured to provide driver functions to provide power to an illumination element based on the digital signals from the one or more digital sensors.

The one or more digital sensors may be mechanically and electrically coupled to the lighting controller via an electrical connector disposed on the lighting controller and a mating electrical connector disposed on the one or more digital sensors. An electrical connection may be formed with a corresponding port of the digital peripheral interface. The digital peripheral interface may be configured to provide power to the at least one smart sensor, and communicate with the at least one smart sensor via LEDcode protocol. The one or more digital sensors may be a gas sensor, a daylight sensor, an occupancy sensor, and/or a proximity sensor.

The wireless communications module may be configured to perform diagnostic test on a back-up power supply. Results of the diagnostic test of the back-up power supply may be transmitted to a remote device via the wireless communications module.

Numerous benefits are achieved by way of the various embodiments over conventional techniques. For example, the various embodiments provide integration of digital sensors within the housing of a luminaire as well as digital communication with connected sensors for self-lighting control of the luminaire. In some embodiments, a digital sensors may interface with an integrated digital lighting controller to provide lighting control without external control signals, thereby providing more accurate lighting control. These and other embodiments along with many of its advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1:
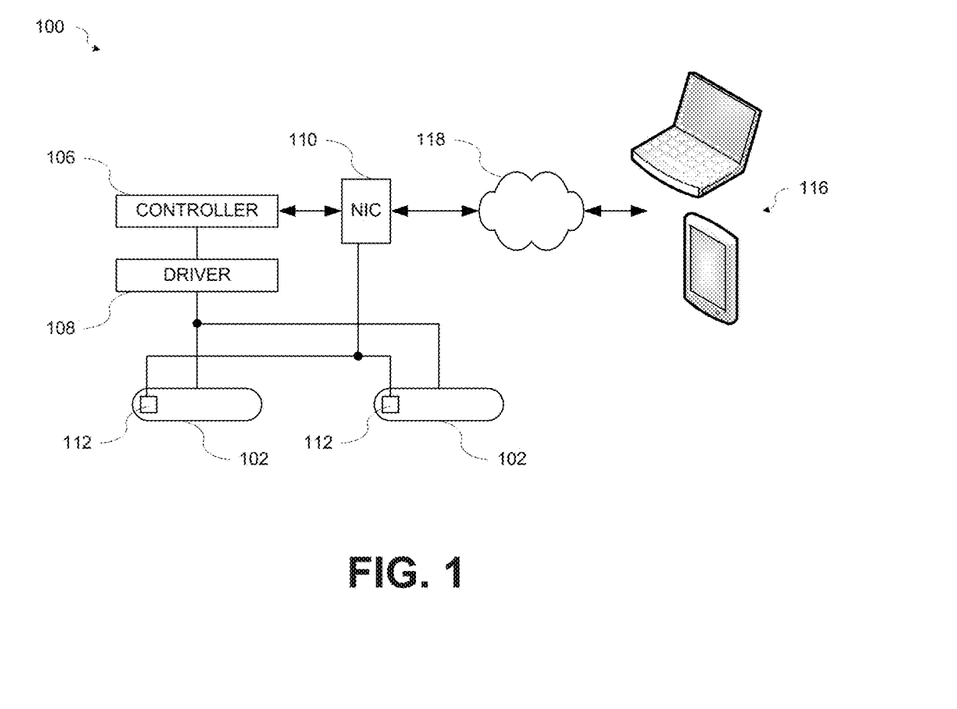
FIG. 1 is a diagram illustrating an exemplary lighting environment in accordance with various aspects of the present disclosure according to various aspects of the present disclosure.

Luminaires in a lighting environment may be controlled at least in part based on sensed conditions, for example, but not limited to, occupancy, daylight, etc., in the lighting environment. FIG. 1 is a diagram illustrating an exemplary lighting environment 100 in accordance with various aspects of the present disclosure. Referring to FIG. 1, the lighting environment 100 may include various luminaires 102 configured to provide illumination for objects in the lighting environment 100. Each luminaire 102 may include a power supply 103, a lighting element 104, a controller 106, a driver 108, a network interface controller 110, and various sensors 112. The various sensors 112 may communicate with the controller 106 via wired or wireless connections. The lighting element of the luminaire 102 may be a light-emitting diode (LED), organic LEDs (OLEDs), a fluorescent lamp, an incandescent lamp, other light emitting device(s), or any combination thereof.

The controller 106 may be used to control the light output from the lighting elements of the luminaire 102, where control of the light output may be determined using one or more inputs to the controller 106. The controller 106 for a given luminaire 102 may be a hard-wired component of the luminaire 102, may be attached to a standard receptacle on the luminaire 102, or may be located remotely from the luminaire 102 (e.g., in a networked lighting system control room of a building). The network interface controller 110 may also receive input over a wireless network 118 from a remote device 116 (e.g., a laptop computer or a mobile phone) via a wireless network interface, for example, but not limited to, a Bluetooth® Low-Energy (BLE) network interface.

In accordance with various aspects of the present disclosure, the controller 106, the driver 108, and the network interface controller 110 may be replaced or augmented by an intelligent control device that is configured to integrate one or more drivers and digital sensors within a luminaire housing, provide wireless communication with mobile devices, provide digital communications among various components of the luminaire, and intelligently control operation of the luminaires 102. The intelligent control device may provide for wired and wireless remote sensory configuration, self-diagnostic test initiation, and data reporting for lighting luminaire systems with and without emergency battery backup. Rather than using independent analog peripherals, the intelligent control device may link simpler digital peripherals (e.g., digital sensors or other sensors capable of communicating via a digital interface) together.

Embodiments in accordance with the present disclosure may reduce redundancy by eliminating AC/DC conversion, wiring, relays, and mechanical enclosures. The various embodiments may incorporate functions for remote communication with a mobile device including: sending sensor configuration settings when a sensor is attached; retrieving analytic information, for example, but not limited to, run hours over temperature correlated to other areas in the fixture, initiating thermal fold-back, and counting a number of times the device ran over temperature; initiating battery back-up power supply self-diagnostic test and read test report; retrieving wireless dimming controls; providing a robust wireless security exchange to safeguard against a hack attack; and RF indoor positioning services.

Luminaires incorporating an integrated digital lighting controller may link devices together within the luminaire housing using the LEDcode protocol for digital communications thereby reducing complexity and cost. The integrated digital lighting controller may enable a self-healing, adaptive mesh network that maintains connectivity regardless of site conditions. For example, integrated digital lighting controllers may wirelessly communicate configuration settings or alarm conditions to other integrated digital lighting controllers in the configured network. In addition, the integrated digital lighting controller may provide power to connected digital peripherals (e.g., digital sensors) thereby eliminating duplication of AC/DC power conversion to provide power to various analog sensors.

Figure 2:
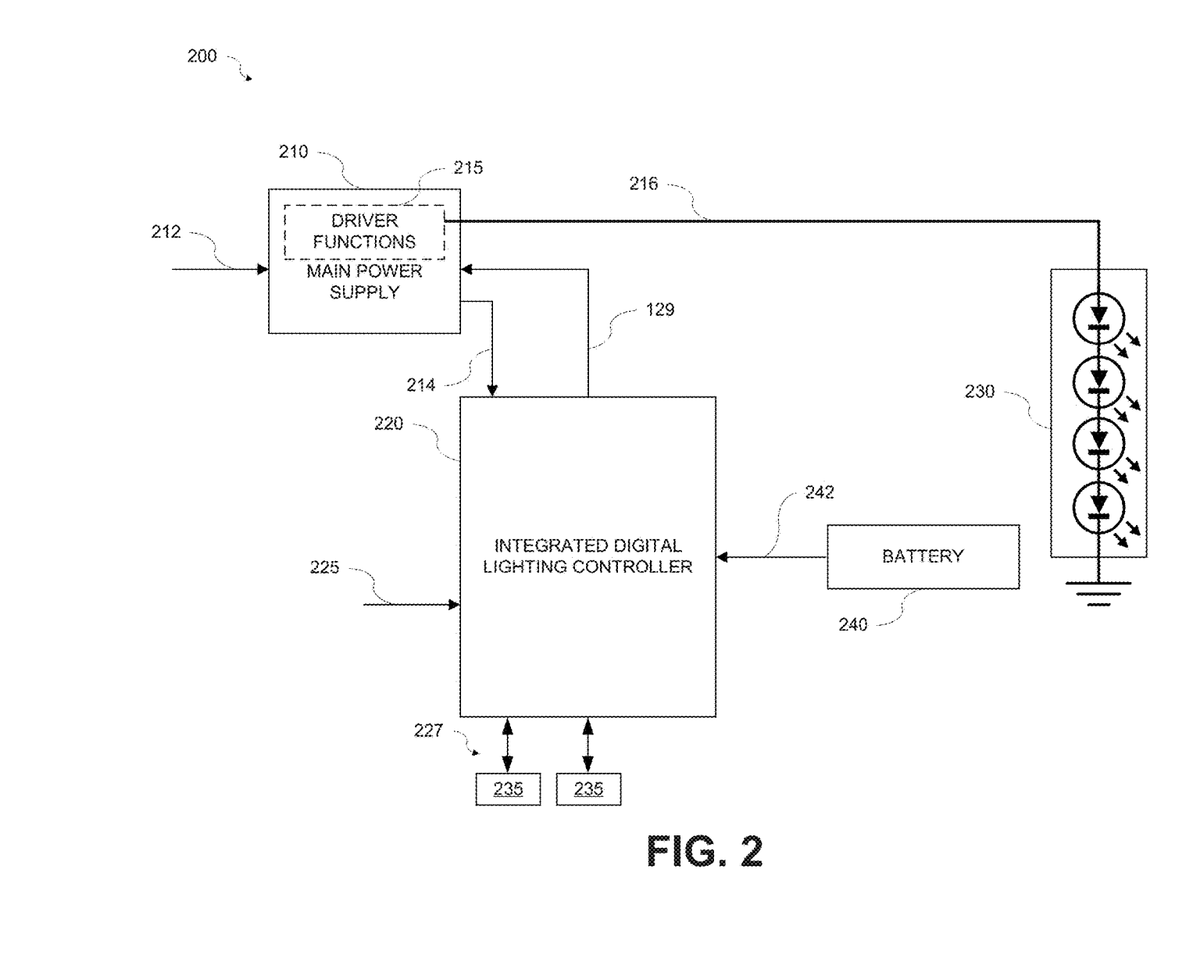
FIG. 2 is a block diagram illustrating a luminaire including an integrated digital lighting controller according to various aspects of the present disclosure.

FIG. 2 is a block diagram illustrating a luminaire 200 including an integrated digital lighting controller according to various aspects of the present disclosure. As illustrated in FIG. 2, the luminaire 200 may include a main power supply 210, an integrated digital lighting controller 220, an illumination element 230, an optional back-up power supply unit 240, and one or more digital sensors 235. The main power supply 210 may incorporate driver functions 215 for the illumination element 230 as well as providing DC power for the components of the luminaire 200. The illumination element 230 may be a light-emitting diode (LED), a fluorescent lamp, an incandescent lamp, other light emitting device(s), or any combination thereof. One of ordinary skill in the art will appreciate that other devices capable of providing illumination may be used without departing from the scope of the present disclosure. In accordance with various aspects of the present disclosure, the main power supply 210, the integrated digital lighting controller 220, the illumination element 230, the back-up power supply unit 240, and the one or more digital sensors 235 may be incorporated into a single luminaire housing.

The main power supply 210 may receive alternating current (AC) line power 212 and supply direct current (DC) power 214 to the integrated digital lighting controller 220. The main power supply 210 may include driver functions 215 configured to supply power 216 to the illumination element 230 based on control signals from the integrated digital lighting controller 220. In some embodiments, the power supply and the driver functions may be separate units. In some embodiments, the luminaire 200 may include a back-up power supply unit 240, for example, a battery power supply, configured to supply auxiliary DC power to the luminaire 200, including the driver functions 215 of the main power supply 210, in the event of AC power loss.

The integrated digital lighting controller 220 may receive control input signals 225, for example, but not limited to, 0-10V or LEDcode signals from a dimmer device or lighting controller. In addition, the integrated digital lighting controller 220 may receive digital signals 227 corresponding to sensed parameters of various digital sensors contained within the luminaire housing, for example, but not limited to, gas sensors, daylight sensors, occupancy sensors, proximity sensors, etc. The integrated digital lighting controller 220 may supply control signals 229, for example, but not limited to, 0-10V or LEDcode control signals, to the main power supply 210 to control the driver functions 215.

The integrated digital lighting controller 220 may generate the control signals to the main power supply 210 to control the driver functions 215 based at least in part on the digital signals 227 from the various digital sensors and/or the control input signals 225, for example from a dimmer device or lighting controller. The integrated digital lighting controller 220 may link, translate, and repeat communication data to peripheral devices, for example, but not limited to, digital sensors, to which it is connected.

For example, the integrated digital lighting controller 220 may power and digitally link the digital sensors, and may provide an isolated 0-10V interface for receiving analog output signals from control devices and providing control signals to the main power supply 210.

While only one illumination element is depicted in FIG. 2, various embodiments are not limited to this implementation. In accordance with aspects of the present disclosure, embodiments a luminaire including the integrated digital lighting controller may incorporate more than one illumination element and a power supply capable of providing driver functions and/or the more than one illumination elements within the luminaire housing, and the integrated digital lighting controller may communicate with and control the more than one driver functions and more than one illumination element.

Figure 3:
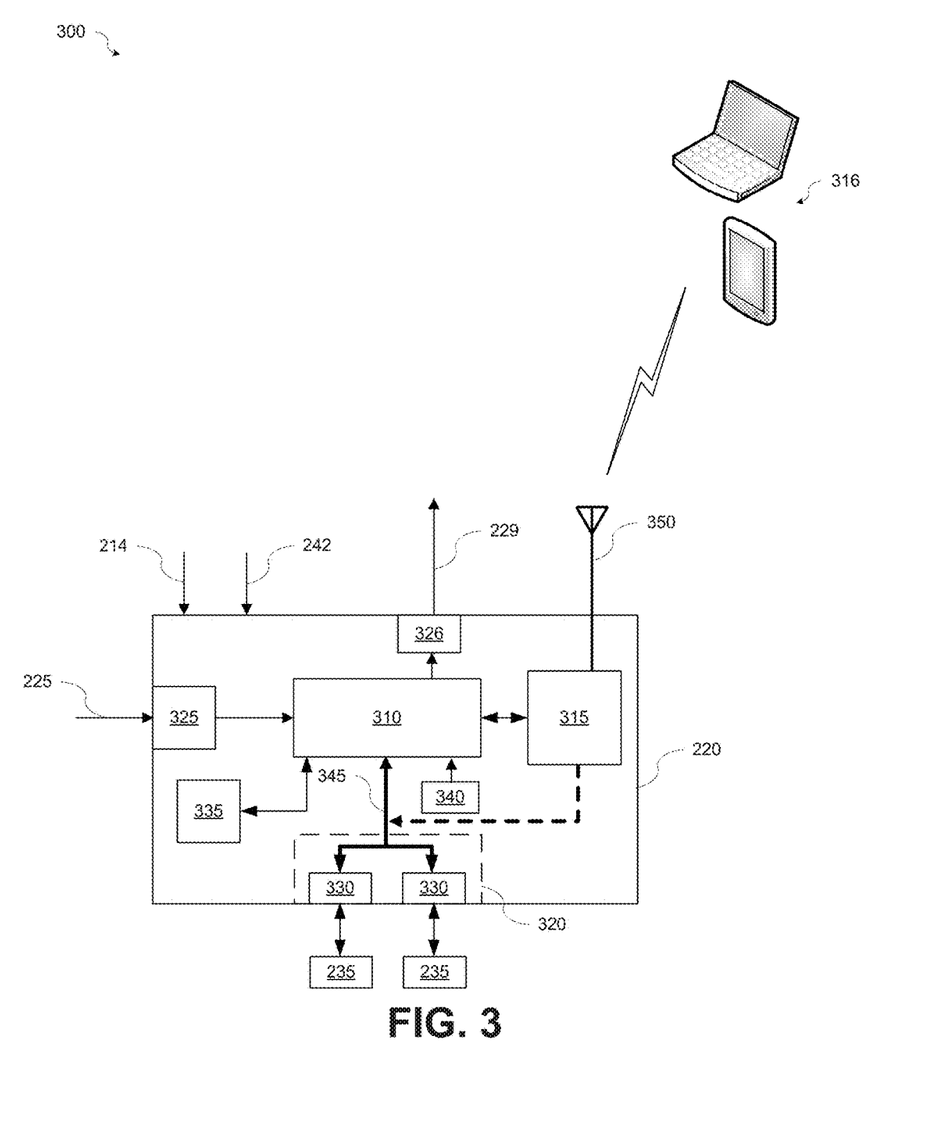
FIG. 3 is a block diagram illustrating an integrated digital lighting controller according to various aspects of the present disclosure.

FIG. 3 is a block diagram 300 illustrating an integrated digital lighting controller 220 according to various aspects of the present disclosure. Referring to FIG. 3, the integrated digital lighting controller 220 may include a processor 310, a wireless communications module 315, a digital peripheral interface 320, an electrically isolated wired control input interface 325, an electrically isolated wired control output interface 326, a temperature sensor 340, a connection for an antenna 350, and a digital communications bus 345. The antenna 350 may be communicatively coupled to the wireless communications module 315 and may enable the wireless communications module 315 to receive configuration settings and control signals from remote devices 316.

The processor 310 may be a microprocessor, microcomputer, computer, microcontroller, programmable controller, or other programmable device. The processor 310 may control overall operation of the luminaire. For example, the processor 310 may output control signals 229 (e.g., 0-10V control outputs, LEDcode outputs, or other control outputs) to the main power supply 210 via the electrically isolated wired control output interface 326 to control the driver functions 215. One of ordinary skill in the art will appreciate that other control outputs may be provided without departing from the scope of the present disclosure.

The integrated digital lighting controller 220 may also include a connector (not shown) configured to provide electrical coupling 242 to the back-up power supply unit 240 incorporated into the luminaire housing as well as an input for a test switch/pilot light associated with the back-up power supply unit 240. The processor 310 of the integrated digital lighting controller 220 may perform diagnostic tests, for example, monthly and/or yearly life safety tests and/or diagnostic tests, for the emergency lighting system, including the back-up power supply unit 240.

In addition, the processor 310 of the integrated digital lighting controller 220 may perform self-diagnostic tests. Test results, both back-up power supply unit tests and self-diagnostic tests, may be communicated via the wireless communications module 315 to a user application running on a remote device 116. Alerts regarding non-compliant test results or operating conditions (e.g., ambient temperature, humidity, etc.) may be generated and wirelessly communicated to users of the application or linked to other devices, for example, to take an action to mitigate the detected condition.

The electrically isolated wired control input interface 325 may accept control signals, for example, but not limited to 0-10V control signals or other control signals, via wired connections from, for example, but not limited to, a dimmer device or lighting controller.

The temperature sensor 340 may communicate with the processor 310 and may provide digital signals corresponding to sensed temperature to the processor 310 enabling the processor 310 to detect various temperature-related conditions and/or initiate various actions. For example, based on the digital temperature signals provided by the temperature sensor 340, the processor 310 may determine to provide control signals 229 to the main power supply 210 to control the driver functions 215 to decrease power provided to the illumination element 230, or initiate thermal fold-back. In addition, various conditions, for example, but not limited to, run hours versus temperature, a number of times an over-temperature condition occurred, etc., may be detected by the processor 310 based on the sensed temperature and reported, for example, via the wireless communications module 315 to a remote device.

In accordance with various aspects of the present disclosure, the processor 310 of the integrated digital lighting controller 220 may generate and/or receive signals based on various protocols, for example, but not limited to, the LEDcode protocol, the nLight® protocol, the DMX protocol, the digital addressable lighting interface (DALI) protocol, or other digital and/or analog lighting control protocols. The signals may include instructions or commands to control lighting characteristics of the illumination element 230.

Similarly, the processor 310 of the integrated digital lighting controller 220 may generate control signals based on sensed parameter signals from the digital sensors 235 received via the digital communications bus 345 to control lighting characteristics of the illumination element 230. The control signals may include instructions or commands to the driver functions 215 of the main power supply 210 to control lighting characteristics of the illumination element 230, for example, but not limited to, light color, color temperature, intensity, light color transitions, dimming levels, or other lighting characteristics, and/or for generating alerts by blinking or significantly changing the color of the light, for example, in response to detection by the digital sensors of high concentrations of hazardous gases.

The digital peripheral interface 320 may include a plurality of peripheral ports 330 and provide power (via the processor 310) and communication for various digital sensors 235, for example, but not limited to, digital gas sensors, digital light sensors, digital passive infrared (PIR) sensors, digital daylight sensors, etc. The digital sensors 235 may include processors, for example, microprocessors or other programmable devices, capable of providing logic and communication functions in addition to the sensing capability.

The integrated digital lighting controller 220 may include a digital communications bus 345. The digital communications bus 345 may provide communications between the processor 310 and the digital peripheral interface 320. The processor 310 may communicate with the digital peripheral interface 320 via the digital communications bus 345 using a known protocol, for example, LEDcode or another protocol. In addition, the digital communications bus 345 may provide DC power to the digital sensors 235 connected to the digital peripheral interface 320.

The digital peripheral interface 320 may communicate with the digital sensors 235 using a known protocol, for example, LEDcode or another protocol. The digital peripheral interface 320 and peripheral ports 330 may be configured to accommodate various sensors, for example, but not limited to, XPoint™ Wireless sensors, nLight Wireless sensors, as well as other wireless sensors (e.g., gas sensors, PIR sensors, daylight sensors, etc.). One of ordinary skill in the art will appreciate that the digital peripheral interface 320 may accommodate other types of digital sensors and/or digital peripheral devices and may include more than two peripheral ports without departing from the scope of the present disclosure.

The digital sensors 235 may be mechanically and electrically connected to the integrated digital lighting controller 220 via a connector on each digital sensor 235. The connector may be configured to plug into a mating connector on the integrated digital lighting controller 220 that is electrically connected to one of the plurality of peripheral ports 330. Communication between digital sensors 235, for example, but not limited to, nLight® sensors, XPoint™ Wireless sensors, etc., that are attached to the digital peripheral interface 320 and the processor 310 may be via the LEDcode protocol or other protocol known to those of skill in the art. The integrated digital lighting controller 220 may accommodate connections to new Internet of Things (IoT) devices as they are developed, for example, via sensor input wire connections or connections to the peripheral ports 330 of the digital peripheral interface 320.

The main power supply 210 may receive control signals 229 from the processor 310 of the integrated digital lighting controller 220 for the driver functions 215 to provide power to the illumination element 230 based on the control signals 229. For example, the main power supply 210 may receive the 0-10V control signals, LEDcode control signals, or control signals using other protocols, from the integrated digital lighting controller 220 to cause the driver functions 215 to dim or turn off the illumination element 230 and respond by dimming or turning off the illumination element 230 accordingly.

In some embodiments, the wireless communications module 315 may include a Bluetooth® radio. The wireless communications module 315 may communicate via one or more wireless protocols, for example, but not limited to, Bluetooth® Bluetooth® Low Energy (BLE), etc. One of ordinary skill in the art will appreciate that other wireless communication protocols may be used without departing from the scope of the present disclosure.

The integrated digital lighting controller 220 may receive input from a remote device 316, for example, but not limited to, a laptop computer, a mobile phone, or other mobile device, via the wireless communications module 315. After establishing a communication session between the remote device 316 and the wireless communications module 124, the remote device 316 may send commands to modify the programming or other configuration of the integrated digital lighting controller 220 for the luminaire. In some implementations, the communication session may be "point-to-point," such as a direct communication session between the remote device 316 and the wireless communications module 315. In other implementations, the communication session may be established through the use of intermediate network devices (e.g., network routers, switches, etc.).

The integrated digital lighting controller 220 may communicate between the remote device 116 or any other components using Bluetooth® (including BLE), LEDcode, nLight®, or other suitable communication protocols, or any combination thereof. The wireless communications module 315 may enable remote customization settings for digital sensors 235 attached to the integrated digital lighting controller 220. For example, configuration settings for a digital sensor 235 may be received by the wireless communications module 315 and forwarded to the processor 310.

The processor 310 may store the configuration settings in the memory 335 and may communicate the configuration settings to the digital peripheral interface 320 via the digital communications bus 345 using a known protocol, for example, LEDcode or another protocol. The digital peripheral interface 320 may then communicate the configuration settings to the digital sensor. In some embodiments, the configuration settings may be communicated from the wireless communications module 315 to the digital peripheral interface 320 via the digital communications bus 345 without intervention by the processor 310.

Various sensor settings, for example, but not limited to, occupancy time delays, photocell range and sensitivity, dimming control settings, task tuning to trim lumens (e.g., as light engines age), etc., may be remotely adjusted on a luminaire. A remotely positioned luminaire, for example, a luminaire disposed 45 feet or another height above the floor, as well as its connected digital sensors, may be remotely configured or commissioned safely from the floor.

In accordance with various aspects of the present disclosure, software and/or firmware updates for the integrated digital lighting controller 220, driver functions 215 of the main power supply 210, and/or digital sensors 235 attached to the digital peripheral interface 320 may be pushed to the devices using BLE or another communication protocol. In addition, similar to passive infrared or microphonic detection, BLE detection or detection using another protocol may be used to turn lights on or keep lights on in a space.

Field calibration operations may be performed remotely between the integrated digital lighting controller 220 and the remote device 116 which are in communication with each other either point-to-point or via a network (e.g., the network 118). The network 118 may include wireless networks such as may be defined by Bluetooth® (including BLE), Wi-Fi®, the IEEE 802.15 standards family, other possible technology standards and protocols, or any combination thereof.

The integrated digital lighting controller 220 may store data, for example, configuration data, status data, etc., in a memory (not shown), for example, in an internal memory of the processor 310 or other memory 335. The configuration data may include the current programming and/or parameters used to configure components of the integrated digital lighting controller 220, such as the driver functions 215 of the main power supply 210, the wireless communications module 124, various digital sensors 235, etc.; one or more stored profiles for the integrated digital lighting controller 220; one or more identifiers for the integrated digital lighting controller 220 and/or luminaire; credentials used to authenticate a remote device 116; and/or other data. The status data may include a record of the state of various components and activities of the integrated digital lighting controller 220. For example, the status data may include data indicating that the current state of an illumination element of a luminaire is "ON" and dimmed to 70% of the maximum brightness as a result of action by the integrated digital lighting controller 220 based on input from one or more digital sensors 235 and a schedule using the time of day.

In accordance with various aspects of the present disclosure, BLE may be used to communicate to users of a mobile application key information related to ambient temperature or humidity if above a preset limit. The preset limits may be set by the user. In some embodiments, the information may be linked to other BLE devices as an alert system. For example, BLE may be used to alert users of the app of potential danger and/or to communicate warning signals. Additionally, BLE may be used communicate monthly and/or yearly life safety tests for the back-up power supply unit 140 and/or self-diagnostic tests for the integrated digital lighting controller 220 and/or luminaire, and test reports and/or non-compliant test results to users via the app. One of ordinary skill in the art will appreciate that while BLE is used in the above examples, other communication protocols, for example, but not limited to, WiFi®, visible light communication (VLC) technologies, etc., may be used without departing from the scope of the present disclosure.

In accordance with various aspects of the present disclosure, as products age, replacement light engines may not match lumens of the original product due to improvement of LEDs. Replacement light engine kits having coded information, for example via a bar code or a QR code may be provided. Scanning the code may provide the application with configuration parameter that may then be communicated via BLE to the integrated digital lighting controller 220 to properly configure the driver for a more efficient match to the replacement light engine.

Figure 4:
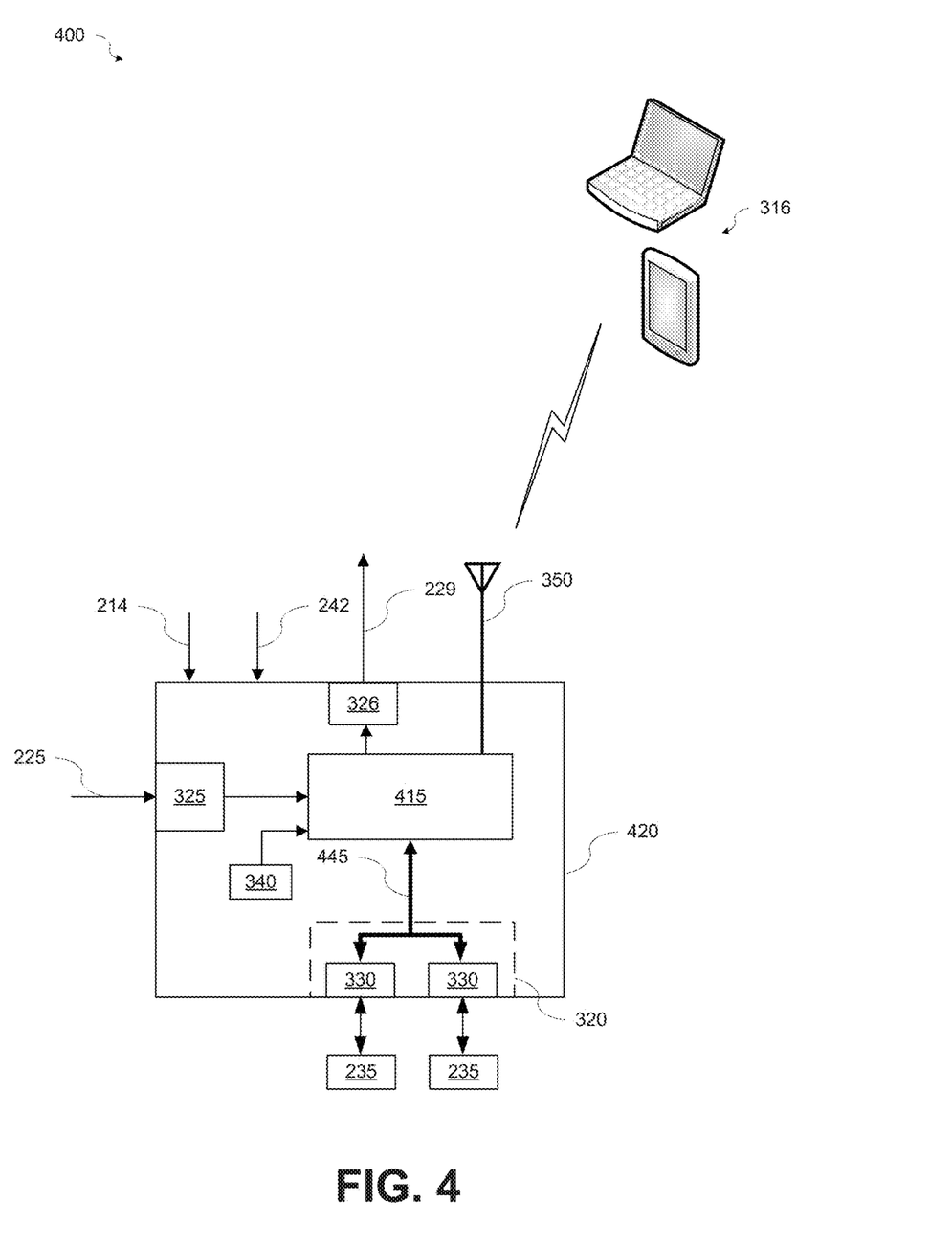
FIG. 4 is a block diagram illustrating an integrated digital lighting controller without a separate processor according to various aspects of the present disclosure.

In some embodiments, the integrated digital lighting controller may not include a separate processor. FIG. 4 is a block diagram 400 illustrating an integrated digital lighting controller 420 without a processor according to various aspects of the present disclosure. Referring to FIG. 4, communication and control for the luminaire may be provided by the wireless communications module 415. The wireless communications module 415 may output control signals 229 (e.g., 0-10V control outputs, LEDcode outputs, or other control outputs) via the electrically isolated wired control output interface 326 to the main power supply 210 to control the driver functions 215. The wireless communications module 415 may generate and/or receive control signals based on various protocols, for example, but not limited to, the LEDcode protocol, the nLight® protocol, the DMX protocol, the digital addressable lighting interface (DALI) protocol, or other digital and/or analog lighting control protocols.

The wireless communications module 415 may communicate with the digital peripheral interface 320 via the digital communications bus 445. The wireless communications module 415 may communicate with the digital peripheral interface 320 via the digital communications bus 445 using a known protocol, for example, LEDcode or another protocol. In addition, the digital communications bus 445 may provide DC power to the digital sensors 235 connected to the digital peripheral interface 320. The wireless communications module 415 may generate control signals to the to the main power supply 210 for the driver functions 215 to provide power to the illumination element 230 based on the digital sensed parameter signals from the various digital sensors.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A luminaire, comprising:
   at least one digital sensor;
   an illumination element;
   a main power supply disposed within a housing of the luminaire, the main power supply including driver functions configured to provide power to the illumination element; and
   an integrated digital lighting controller disposed within the housing of the luminaire and comprising a digital communications bus, the integrated digital lighting controller in communication with the main power supply and the at least one digital sensor, the integrated digital lighting controller configured to:
   receive lighting control signals according to a lighting control protocol;
   receive, via the digital communications bus, digital signals corresponding to a sensed parameter from the at least one digital sensor in communication with a digital peripheral interface;
   determine a lighting characteristic for the illumination element based at least in part on the digital signals from the at least one digital sensor and the lighting control signals; and
   generate one or more control signals to the main power supply to control the driver functions to provide power to the illumination element to produce the determined lighting characteristic.

2. The luminaire of claim 1, wherein the digital peripheral interface is configured to provide mechanical and electrical coupling of the at least one digital sensor to the integrated digital lighting controller via an electrical connector disposed on the integrated digital lighting controller and a mating electrical connector disposed on the at least one digital sensor, and wherein the digital peripheral interface is configured to communicate with a processor of the integrated digital lighting controller via a digital communications bus.

3. The luminaire of claim 1, wherein the digital peripheral interface is configured to provide power to the at least one digital sensor, and communicate with the at least one digital sensor via LEDcode protocol.

4. The luminaire of claim 1, wherein the at least one digital sensor is one of a gas sensor, a daylight sensor, an occupancy sensor, and a proximity sensor.

5. The luminaire of claim 1, further comprising a wireless communications module, wherein configuration settings for the at least one digital sensor are received from a remote device via the wireless communications module.

6. The luminaire of claim 1, further comprising a wireless communications module configured to receive configuration settings for the luminaire from a remote device and transmit information related to operating conditions of the luminaire to the remote device.

7. The luminaire of claim 1, wherein the integrated digital lighting controller is configured to perform self-diagnostic tests, and results of the self-diagnostic tests are transmitted to a remote device via a wireless communications module.

8. The luminaire of claim 1, further comprising a back-up power supply, wherein the integrated digital lighting controller is communicatively coupled to the back-up power supply and is configured to perform diagnostic tests on the back-up power supply.

9. The luminaire of claim 8, wherein results of the diagnostic tests of the back-up power supply are transmitted to a remote device via a wireless communications module.

10. The luminaire of claim 1, further comprising:

a back-up power supply, wherein the at least one digital sensor, the illumination element, the main power supply, the integrated digital lighting controller, and the back-up power supply are disposed in a housing of the luminaire.

11. An integrated digital lighting controller disposed within a housing of a luminaire, the integrated digital lighting controller comprising:

a processor;

a digital peripheral interface; and a digital communications bus, wherein the processor is communicatively coupled to the digital peripheral interface via the digital communications bus, and is configured to:

receive lighting control signals according to a lighting control protocol;

receive, via the digital communications bus, digital signals corresponding to a sensed parameter from one or more digital sensors in communication with the digital peripheral interface; and provide lighting control signals to a main power supply disposed within a housing of the luminaire and configured to provide driver functions to provide power to an illumination element based on the digital signals from the one or more digital sensors and the lighting control signals.

12. The integrated digital lighting controller of claim 11, wherein the digital peripheral interface is configured to:

provide power to the one or more digital sensors, and communicate with the one or more digital sensors via LEDcode protocol.

13. The integrated digital lighting controller of claim 11, wherein the one or more digital sensors are mechanically and electrically coupled to the integrated digital lighting controller via an electrical connector disposed on the integrated digital lighting controller and a mating electrical connector disposed on the one or more digital sensors, and wherein an electrical connection is formed with a corresponding port of the digital peripheral interface.

14. The integrated digital lighting controller of claim 13, wherein the one or more digital sensors comprises one or more of a gas sensor, a daylight sensor, an occupancy sensor, and a proximity sensor.

15. The integrated digital lighting controller of claim 11, further comprising a wireless communications module communicatively coupled to the processor, wherein the wireless communications module is configured to receive configuration settings from a remote device and transmit information related to operating conditions of a luminaire to the remote device.

16. The integrated digital lighting controller of claim 11, wherein the processor is configured to perform diagnostic test on a back-up power supply, and wherein results of the diagnostic test of the back-up power supply are transmitted to a remote device via a wireless communications module.

17. An integrated digital lighting controller, comprising:

a wireless communications module;

a digital peripheral interface; and a digital communications bus, wherein the wireless communications module is communicatively coupled to the digital peripheral interface via the digital communications bus, and is configured to receive digital signals corresponding to a sensed parameter from one or more digital sensors in communication with the digital peripheral interface; and wherein the integrated digital lighting controller is operable to provide lighting control signals to a main power supply configured to provide driver functions to provide power to an illumination element based on the digital signals from the one or more digital sensors and lighting control signals received according to a lighting control protocol.

18. The integrated digital lighting controller of claim 17, wherein the one or more digital sensors are mechanically and electrically coupled to the integrated digital lighting controller via an electrical connector disposed on the integrated digital lighting controller and a mating electrical connector disposed on the one or more digital sensors, and wherein an electrical connection is formed with a corresponding port of the digital peripheral interface.

19. The integrated digital lighting controller of claim 17, wherein the digital peripheral interface is configured to:

provide power to the one or more digital sensors, and communicate with the one or more digital sensors via LEDcode protocol.

20. The integrated digital lighting controller of claim 17, wherein the one or more digital sensors comprise one or more of a gas sensor, a daylight sensor, an occupancy sensor, and a proximity sensor.

21. The integrated digital lighting controller of claim 17, wherein wireless communications module is configured to perform diagnostic test on a back-up power supply, and results of the diagnostic test of the back-up power supply are transmitted to a remote device via the wireless communications module.

\* \* \* \* \*